Jan. 9, 1963  SATOSHI NAGAI ETAL  3,363,039

INJECTION MOLDING PROCESSES FOR THERMOPLASTIC MATERIALS

Filed Aug. 4, 1964   2 Sheets-Sheet 1

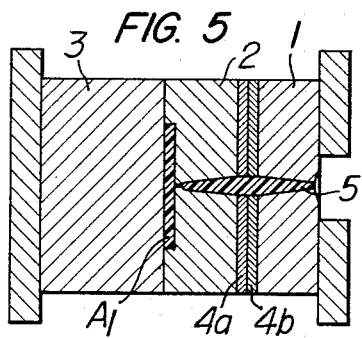
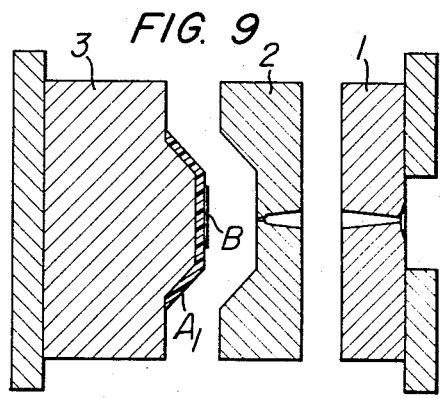
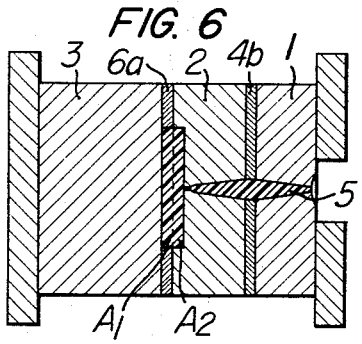
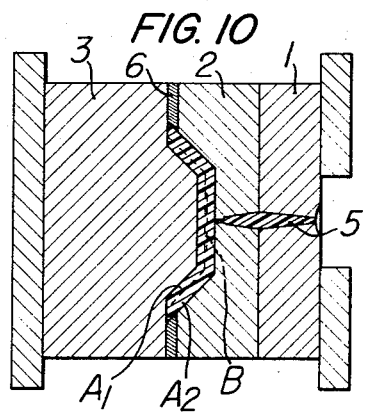
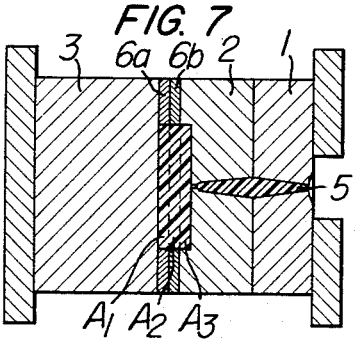
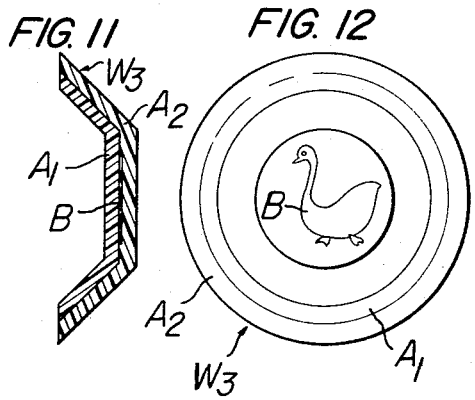
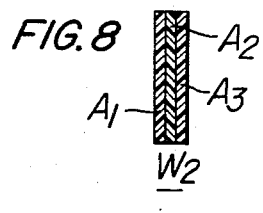

ously designed
United States Patent Office 3,363,039
Patented Jan. 9, 1968

3,363,039
INJECTION MOLDING PROCESSES FOR THERMOPLASTIC MATERIALS
Satoshi Nagai, Tokyo, and Koji Furumoto, Yokohama, Japan, assignors to Asahi-Dow Limited, Tokyo, Japan, a corporation of Japan
Filed Aug. 4, 1964, Ser. No. 387,449
Claims priority, application Japan, Aug. 9, 1963, 38/40,818
3 Claims. (Cl. 264—245)

ABSTRACT OF THE DISCLOSURE

Two or three-layered molded products having decorative appearance and containing reinforcement inclusions obtained by conducting a first molding in known manner, followed by insertion of an appropriate spacer in the plane of contact between the core plate and the cavity plate of the mold at the end of the first molding, thereafter conducting a second injection, and if desired, another spacer can be inserted at the end of the second molding. An inclusion is deposited at the end of the first molding.

---

The present invention relates to processes of molding thermoplastic materials and more particularly to processes of injection molding by the use of an injection mold with which spacers are combined to obtain molded articles.

In prior injection molding processes for the manufacture of molded articles of thermoplastic materials, the thickness of molded articles is limited by a specific mold when such mold of fixed dimensions is singly used for the molding, and therefore it has hitherto been necessary to prepare molds of different mold cavity thicknesses in order to obtain molded articles of different thicknesses, or it has been necessary to prepare a specifically designed mold of complex structure and function so that its mold cavity thickness may be variable to deal with different thicknesses of mold articles. Further, in conventional injection molding processes which do not rely upon flow-molding-machines or any other special methods, it has been difficult to successfully obtain molded articles having a thickness over 7 millimeters because sink marks and bubbles are liable to develop in such articles. Even when satisfactory molded articles can be obtained by such processes, an extremely long cooling time in the mold has been required and a marked reduction in the molding efficiency has therefore been inevitable.

It has hitherto been practised in the art to seal materials such as paper, cloth and metal foils (hereinafter to be referred to as other materials) in molded articles to enhance the attractiveness of the molded articles, to obtain decorative articles, or to provide a reinforcing effect thereto. Such conventional practices, for example, include a process of sealing other materials in thermosetting materials in their prepolymer state, a process of cast-molding other materials in thermoplastic materials in their prepolymer state, a process of sealing other materials by means of compression molding with the use of thermoplastic materials in the form of granules, and a process of interposing other materials between thermoplastic sheets, heating the thermoplastic sheets to their softening point and pressing the hot and pliable sheets. When the materials are fine particles of metal and short fibers of glass which can easily pass through the nozzle of an injection molding machine and the gate of an injection mold, it is possible to seal these other materials in molded articles without requiring any special means and this has hitherto been practised in the art of injection molding for thermoplastic materials. However, some means must be provided in order that other materials having a certain size, shape, etc. may suitably be sealed in a desired position in a molded article of thermoplastic material with the use of an injection molding machine. Since the injection molding process as one form of various processes of molding the thermoplastic materials is a process to attain the economical and rapid production of high-quality precision articles, it will be quite useful to provide a process for effectively sealing other materials in molded articles while maintaining the characteristics of injection molding and without appreciably lowering the molding efficiency. According to such useful process, a decorative pattern may be sealed in a molded article to eliminate a difficulty involved in decorating the surface of a molded article with a pattern and it is possible to economically obtain the finished articles whose value is enhanced by the joint effect of decoration and reinforcement.

The present invention has been made to solve the prior problems as described above and provides an effective and efficient process for the injection molding of thermoplastic materials.

According to this invention, there is provided a process for the injection molding of thermoplastic materials by the use of an injection mold, comprising the steps of first molding by said mold a portion of an article to be molded, interposing at least one spacer between the faces of relatively movable sections of said mold, and then molding for completing the molding of the remaining portion of the article.

According to the present invention, there is also provided a process of above character, further comprising the step of placing other materials on the gate side surface of the molded layer after the first injection molding but before the next injection molding for sealing said other materials in the molded article.

According to the present invention, it is possible to manufacture various molded articles which can not be obtained by a single injection mold of conventional structure, and further the invention provides practical as well as economical advantages in that a conventional injection mold can be utilized for the manufacture of various molded articles.

Or more precisely, the primary object of the present invention is to provide an improved injection molding process for obtaining various molded articles such as trays, dishes, bowls, boxes, cups, and any other vessels, decorative articles, and the like.

A special object of the present invention is to provide an injection molding process for sealing other materials in the interior of molded articles for thereby making patterns or figures visible therethrough or providing a reinforcing effect thereto.

A further object of the present invention is to provide an injection molding process in which the thickness of molded articles is freely variable.

Another object of the present invention is to provide an injection molding process for obtaining molded articles with substantial thickness.

A still further object of the invention is to provide an injection molding process for obtaining a molded article having more than two layers of different colors.

There are other objects and particularities of the present invention which will become obvious from the following description with reference to the accompanying drawings, in which:

FIGS. 1 and 2 are longitudinal sectional views of an injection mold in two different operating steps when an injection molding process embodying the present invention is adapted to the molding of a two-layer article, FIG. 1 showing the state after the first injection and FIG. 2 showing the state after the second injection;

FIGS. 5, 6 and 7 are longitudinal sectional views of an injection mold in three different operating steps when the injection molding process of the present invention is adapted to the molding of a three-layer article, FIG. 5 showing the state after the first injection, FIG. 6 showing the state after the second injection and FIG. 7 showing the state after the third injection;

FIG. 8 is a longitudinal sectional view of a molded article obtained by the process shown in FIGS. 5, 6 and 7;

FIGS. 9 and 10 are longitudinal sectional views of an injection mold in two different operating steps when other material is sealed in a molded article in the case of two-layer molding, FIGS. 9 showing in an exploded manner the state in which the mold is opened after a first injection and other material is placed on the first molded layer and FIG. 10 showing the state after a second injection;

FIG. 11 is an enlarged longitudinal sectional view of a molded article obtained by the process shown in FIGS 9 and 10; and FIG. 12 is an enlarged front elevational view of the molded article shown in FIG. 11.

Figure 1:
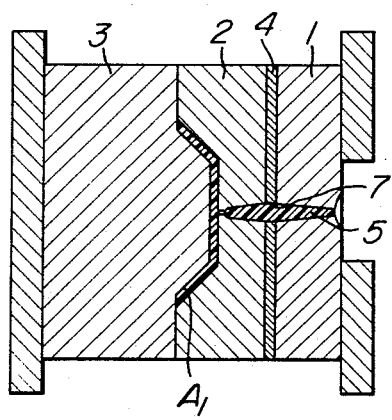
Figure 3:
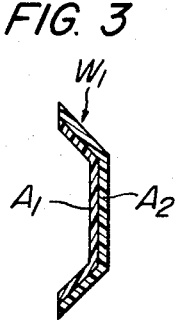
FIG. 3 is a longitudinal sectional view of a molded article obtained by the process shown in FIGS. 1 and 2.
Figure 2:
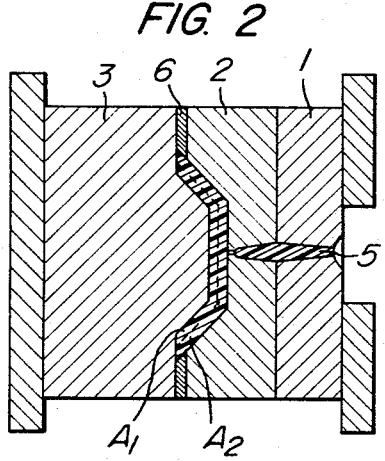

In the accompanying drawings, like numerals are used throughout to denote like parts. Referring now to FIGS. 1 and 2, there is shown a conventional injection mold which comprises a front plate 1, a cavity plate 2 and a core plate 3. According to an injection molding process of the present invention, a front spacer 4 is interposed between the front plate 1 and the cavity plate 2 of the injection mold as shown in FIG. 1 and first injection molding is carried out. The front spacer 4 has a thickness equal to that of a rear spacer 6 (FIG. 2) for the reason as will be described later and has a central axial bore 7 for admitting passage therethrough of a sprue 5 so as not to obstruct the flow of thermoplastics. By the first injection, molten thermoplastics is filled in a cavity defined between the cavity plate 2 and the core plate 3 of the mold to form a molded layer $A_1$. After the molded layer $A_1$ has sufficiently been cooled, the mold is urged to its open position and the front spacer 4 and the sprue 5 are removed therefrom. Then, a rear spacer 6 is inserted in the space between the cavity plate 2 and the core plate 3 as shown in FIG. 2, the mold again is urged to its closed position, and second injection molding is performed. By the second injection, a molded layer $A_2$ corresponding in thickness with that of the rear spacer 6 is formed in overlapped relation with the first molded layer $A_1$. Therefore, the rear spacer 6 is to have a thickness corresponding with a desired thickness of the molded layer $A_2$ to be provided by the second injection molding. Generally, the rear spacer and the front spacer may have a thickness of 1 to 10 millimeters and may be of metal or any other suitable material. After the molded layer $A_2$ has sufficiently been cooled, the mold is urged to its open position and a molded article $W_1$, the rear spacer 6 and the sprue 5 are removed therefrom. The above operation completes one cycle of the injection molding process provided by the present invention. As shown in FIG. 3, the finished molded article $W_1$ has a thickness which is the thickness of the first molded layer $A_1$ plus the thickness of the second molded layer $A_2$.

In the operation described above, the front spacer 4 and the rear spacer 6 are alternately inserted and removed in order to always maintain the special thickness of the mold at a constant value. Mold clamping mechanisms presently generally employed in the art comprise a straight hydraulic system, a toggle-hydraulic system and a wedge toggle system. In the toggle-hydraulic system and the wedge toggle system among them, the required clamping force cannot be obtained if a constant special thickness across a mold is not maintained at all times. This is why a front spacer and a rear spacer of equal thickness are alternately inserted in and removed from the mold. In the straight hydraulic system, however, necessary clamping of a mold can be effected regardless of slight variation in the special thickness across the mold and therefore the constant special thickness of the mold need not necessarily be maintained at all times. In the straight hydraulic system, therefore, slight variation in the special thickness across the mold is allowable and does not affect the molding process. In the mold clamping mechanism such as the straight hydraulic system, it is possible to attain the injection molding with the use of the rear spacer alone and without using the front spacer, and thus to eliminate the steps of alternate insertion and removal of the front and rear spacers.

Figure 4:
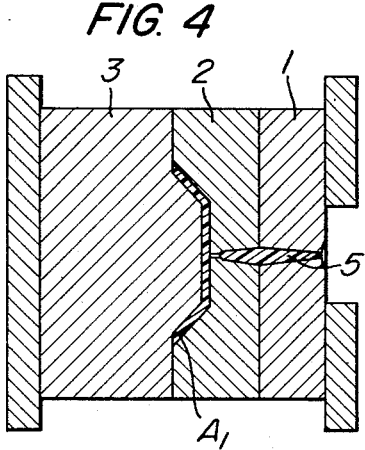
FIG. 4 is a view similar to FIG. 1, but showing a case of molding a two-layer article with a clamping system which dispenses with continual maintenance of the constant thickness of a mold.

According to the injection molding process employing the straight hydraulic system, first injection molding is effected in a state in which there is no front spacer 4 interposed between front plate 1 and cavity plate 2 of a conventional injection mold as shown in FIG. 4. After a molded layer $A_1$ obtained by the first injection has sufficiently been cooled, the mold is urged to its open position to remove sprue 5 therefrom. Then, rear spacer 6 is interposed between a core plate 3 and the cavity plate 2 in a manner as shown in FIG. 2, the mold is urged to its closed position, and second injection is made. Thus, a molded layer $A_2$ having a thickness corresponding with that of the rear spacer 6 is formed. After the second molded layer $A_2$ has sufficiently been cooled, the mold is urged to its open position and a molded article $W_1$, the rear spacer 6 and the sprue 5 are removed therefrom. An injection mold of two-plate type may also be used with the mold clamping mechanism such as the straight hydraulic system. In the injection molding process described above, the first injection molding alone may successively be carried out to obtain a multiplicity of molded articles formed by the first injection molding, instead of successively effecting the first and the second injection molding or making alternate insertion and removal of the front and rear spacers. Then, the molded articles may successively be fitted on the core plate surface and the second injection molding may be applied to each of the first molded articles. This process is especially suitable for obtaining molded articles of two-layer structure with different colors, but any of the above-described processes may effectively be employed to obtain molded articles of two-layer structure with different colors.

Molded articles with three-layer structure can likewise be obtained by preparing two rear spacers having thicknesses corresponding with desired thicknesses of respective layers to be molded by the second and the third injection molding and arranged to be interposed between a cavity plate and a core plate and by preparing two front spacers having thicknesses equal to the respective thicknesses of the two rear spacers and arranged to be interposed between a front plate and the cavity plate of an injection mold. The manner of obtaining such molded articles with three-layer structure will be described with reference to FIGS. 5 to 8. A rear spacer $6_a$ shown in FIG. 6 has a thickness corresponding with a desired thickness of a layer $A_2$ to be molded by the second injection molding. A rear spacer $6_b$ shown in FIG. 7 has a thickness corresponding with a desired thickness of a layer $A_3$ to be molded by the third injection molding. A front spacer $4_a$ in FIG. 5 has a thickness equal to that of the rear spacer $6_a$, and a front spacer $4_b$ in FIG. 6 has a thickness equal to that of the rear spacer $6_b$. The front spacers $4_a$ and $4_b$ are each centrally bored to permit passage therethrough of a sprue 5 as in the case of the front spacer 4 in FIG. 1. At first, both of the front spacers $4_a$ and $4_b$ are interposed between a front plate 1 and a cavity plate 2 as shown in FIG. 5, and the first injection molding is made without any rear spacers interposed in the mold. Then, one of the front spacers $4_a$ is removed from between the front plate 1 and the cavity plate 2 with the front spacer $4_b$ alone left in place and the rear spacer $66_a$ is interposed between the cavity plate 2 and a core plate 3, the second injection molding being then made. Subsequently, the front spacer $4_b$ is removed and the rear spacer $6_b$ is interposed in the mold so that there are two rear spacers $6_a$ and $6_b$ interposed between the cavity plate 2 and the core plate 3, the third injection molding being then made. The above operation completes one cycle for molding an article with three-layer structure. In this case, a finished molded article $W_2$ shown in FIG. 8 has a thickness which is the sum of the thickness of the first molded layer $A_1$, the thickness of the second molded layer $A_2$ and the thickness of the third molded layer $A_3$. It will be understood that, in the molding of articles with three-layer structure, the front spacers may likewise be eliminated when a mold clamping mechanism which dispenses with the necessity of continually maintaining the constant special thickness of the mold is employed to cooperate with the mold.

The invention will next be described with regard to a case of sealing other materials in a molded article with two-layer structure. At first, a front spacer 4 is interposed betwen a front plate 1 and a cavity plate 2 in a manner as shown in FIG. 1 and first injection molding is made. After a first molded layer $A_1$ has sufficiently been cooled, the mold is urged to its open position, and the front spacer 4 and sprue 5 are removed therefrom. Then, other material B intended to be sealed in the article is placed at a desired position on the surface on the gate side of the first molded layer $A_1$ on the core plate 3 as shown in FIG. 9 or, if required, may be bonded onto such surface by the use of a solvent or a bonding agent suitable for thermoplastics material. Then, as shown in FIG. 10, a rear spacer 6 is interposed between the core plate 3 and the cavity plate 2 and second injection molding is made. Thus, a molded layer $A_2$ is formed and the sealed material B is sealed between the molded layers $A_1$ and $A_2$ in its original shape. After the second injection molded layer $A_2$ has sufficiently been cooled, the mold is urged to its open position and a finished molded article $W_3$ is removed therefrom. FIGS. 11 and 12 are enlarged sectional and front elevational views, respectively, of the finished article $W_3$ obtained by the above process. The above operation completes one cycle for sealing other material in a molded article.

Other materials to be sealed in the interior of molded articles may be any one or a suitable combination of those selected from a group of materials which can constitute a pattern or a figure such as fabrics with coarse texture, cloth, paper, photographs, pictures, printed matters, leaves, flowers, insects, saw-dust, metal foils, ore fragments, and fragments of shells, and these materials may suitably be arranged to give a decorative appearance.

In this case, an especially beautiful appearance may be obtained by arranging any one or both of the first and second molded layers to be transparent because the other material sealed in the article can be viewed through the transparent layer or layers. Further, for the purpose of providing reinforcement to the molded article, any one or a suitable combination of those selected from a group of fibers, wires, cloth, paper, screen meshes, plates, sheets, foils, etc. and processed matters thereof, made of glass, metal, synthetic materials, cellulose and other materials may be sealed in the molded articles.

The thermoplastic material preferred in practising the injection molding process of the present invention may be polystyrene, styrene-acrylonitrile copolymer, rubber modified polystyrene, polyvinyl chloride, polyethylene and the like.

Molded articles produced by the injection molding process according to the present invention are obtained in various forms including vessels such as trays, dishes, bowls, boxes, and cups and various articles such as decorations. These molded articles can be obtained in a thickness over 7 millimeters, in a structure with layers of different colors, in a beautiful and gorgeous form with other material sealed therein or in a form reinforced with other material. It will be understood that a suitable combination of the injection molding processes described in the above may simultaneously be effected, and insertion and removal of spacers may also automatically be effected.

Several examples of the injection molding process of the present invention are tabulated as described below. articles tabulated below were molded at cylinder temperatures, mold temperatures, injection pressures and cycle times commonly employed for respective thermoplastics.

EXAMPLES

| Items | Number | | | |
|---|---|---|---|---|
| | 1 | 2 | 3 | 4 |
| Molded articles | Saucer for coffee cup: outside dia., 150 mm.; thickness, 4 mm.; weight, 70 g. | Experimental article: outside dia., 150 mm.; thickness, 15 mm.; weight, 280 g. | Decorative dish: outside dia., 300 mm.; thickness, 6 mm.; weight, 445 g. | Decorative dish: outside dia., 300 mm.; thickness, 6 mm.; weight, 445 g. |
| Molds | Three plates type | Three plates type | Three plates type | Three plates type. |
| Clamping systems | Straight hydraulic system | Toggle hydraulic system | Toggle hydraulic system | Toggle hydraulic system. |
| Spacers | One rear spacer of steel plate, thickness, 2 mm. | Two front spacers and two rear spacers of steel plate, thickness, 5 mm. | One front spacer and one rear spacer of steel plate, thickness, 3 mm. | One front spacer and one rear spacer of steel plate, thickness, 3 mm. |
| Sealed materials | None | None | Japanese paper, thickness, 9 g./m.², no bonding agent used. | Printed picture of animal cut out of paper, thickness, 400 g./m.², bonding agent used. |
| Thermoplastic materials. | Styron 666 [1] first injection, Clear; second injection, White. | Styron 475,[2] Natural | Tyril 767,[3] Clear | Tyril 767 first injection, Clear; second injection, Ivory. |
| Note | Different colored two layers | Monocolored three layers | Monocolored two layers with sealed-in material. | Different colored two layers with sealed-in material. |

[1] Styron 666 is the trade name of polystyrene sold by Asahi-Dow Limited.
[2] Styron 475 is the trade name of rubber modified polystyrene sold by Asahi-Dow Limited.
[3] Tyril 767 is the trade name of styrene-acrylonitrile copolymer sold by Asahi-Dow Limited.

It will be undestood from the foregoing detailed description that, according to the injection molding process of the invention, mere incorporation of spacers in an injection mold can effectively make a pattern or a figure to appear in a molded article, provide a reinforcing effect to a molded article, provide a molded article with more than two layers of different colors, provide a substantially thick article, and provide molded articles of variable thickness with the use of a single mold of fixed dimensions. Although, in the above description, the basic forms of the injection molding process employing spacers for cooperation with an injection mold have been disclosed, it will be understood that the inventive process is equally effectively applicable to an injection molding machine of the type in which thermoplastics of different colors can alternately be injected from respective nozzles, to a molding machine having a hot nozzle and to a molding machine with a mold having a hot runner to attain a molding having various effects, and that various other modifications and changes may be made without departing from the spirit of the present invention.

What is claimed is:

1. A process for forming a thermoplastic product of a number of layers in an injection mold constituted by a front plate, a cavity plate and a core plate said process comprising arranging the said plates in the above order, interposing a spacer of determinable thickness between the front plate and the cavity plate, clamping the plates into abutment with the interposed spacer to form an assembled mold of a specific depth, injection molding thermoplastic material into a cavity formed between the core plate and the cavity plate to obtain a first molded layer of thermoplastic material, removing said spacer from the mold and interposing a spacer of substantially the same thickness as the first spacer between the cavity plate and the core plate so that the overall depth of the mold is maintained while a cavity is formed between the cavity plate and the thus formed layer of thermoplastic material, placing an intermediate layer of material on said first molded layer of thermoplastic material, and thereafter injection molding thermoplastic material into the latter cavity to form a second molded layer of thermoplastic material which forms a composite body with the first layer with the intermediate layer embedded between the thermoplastic layers.

2. A process as claimed in claim 1 wherein the thermoplastic material of one of said layers is transparent.

3. A process as claimed in claim 1 wherein said thermoplastic product is formed of three layers by placing two spacers between the front plate and the cavity plate before the first injection molding, removing one of the latter spacers after molding the first layer and leaving the other spacer in place while placing the first mentioned spacer between the cavity plate and the core plate, removing said other of the spacers from between the front plate and the cavity plate after the second injection molding step, placing a second spacer between the core plate and cavity plate of a thickness substantially equal to that of the spacer last removed from between the front plate and the cavity plate whereby a constant overall depth is maintained for the mold, and a cavity is formed between the two layers of thermoplastic material and the cavity plate and injection molding a third thermoplastic layer in the latter cavity to form a third layer which forms a composite body with the first two layers.

References Cited

UNITED STATES PATENTS

| | | | |
|---|---|---|---|
| 3,122,598 | 2/1964 | Berger | 264—265 X |
| 3,060,506 | 10/1962 | Uschmann | 25—41.4 X |
| 3,160,921 | 12/1964 | Ludwig | 264—244 X |
| 2,703,435 | 3/1955 | Watson | 264—247 X |
| 2,279,208 | 4/1942 | Shaw | 18—30 |
| 3,320,345 | 5/1967 | Lirones | 264—255 |

ROBERT F. WHITE, *Primary Examiner.*

R. B. MOFFITS, J. H. SILBAUGH, *Assistant Examiners.*